United States Patent [19]
Paquette et al.

[11] Patent Number: 5,289,802
[45] Date of Patent: Mar. 1, 1994

[54] INTERNAL COMBUSTION ENGINE HAVING OPPOSED PISTONS

[76] Inventors: Maxime Paquette; Hubert Paquette, both of 1056 Aubin St., St-Jovite, Québec, Canada, J0T 2H0

[21] Appl. No.: 964,553

[22] Filed: Oct. 21, 1992

Related U.S. Application Data

[63] Continuation-in-part of Ser. No. 758,615, Sep. 12, 1991, abandoned.

[51] Int. Cl.⁵ .............................................. F02B 75/28
[52] U.S. Cl. ............................... 123/18 A; 123/51 AA; 123/51 BA
[58] Field of Search ............. 123/51 AA, 51 A, 51 R, 123/51 BA, 18 A, 18 R, 193.2

[56] References Cited

U.S. PATENT DOCUMENTS

| | | |
|---|---|---|
| 661,300 | 11/1900 | Antisell et al. |
| 1,201,098 | 10/1916 | Pulman . |
| 1,707,005 | 3/1929 | Hall ................... 123/51 R |
| 1,808,083 | 6/1931 | Tibbetts ............... 123/51 AA |
| 1,823,399 | 9/1931 | Hemmingsen . |
| 1,892,474 | 12/1932 | Satrum . |
| 1,958,957 | 5/1934 | Rakos ................ 123/51 A |
| 2,248,989 | 7/1941 | Hanson . |
| 2,345,056 | 3/1944 | Mallory ............... 123/51 BA |
| 2,486,185 | 10/1949 | Mallory . |
| 2,899,945 | 8/1959 | Carvalho . |
| 3,312,206 | 4/1967 | Radovic ............... 123/78 |
| 3,485,221 | 12/1969 | Feeback . |
| 3,580,228 | 5/1971 | Rocha ................ 123/18 A |
| 3,868,931 | 3/1975 | Dutry et al. .......... 123/51 R |
| 4,419,969 | 12/1983 | Bundrick ............. 123/51 R |
| 4,438,737 | 3/1984 | Burandt .............. 123/90.31 |
| 4,790,284 | 12/1988 | Ferrenberg et al. ...... 123/543 |
| 4,841,927 | 6/1989 | Slee .................. 123/193.2 |
| 4,996,953 | 3/1991 | Buck ................. 123/51 A |
| 5,074,253 | 12/1991 | Dettwiler ............ 123/18 R |

FOREIGN PATENT DOCUMENTS

| | | |
|---|---|---|
| 140545 | 5/1912 | Canada . |
| 146925 | 12/1912 | Canada . |
| 320863 | 3/1932 | Canada . |
| 373490 | 5/1938 | Canada . |
| 799204 | 11/1968 | Canada . |
| 1001954 | 12/1976 | Canada . |
| 1034550 | 7/1978 | Canada . |
| 1081564 | 7/1980 | Canada . |
| 1119965 | 3/1982 | Canada . |
| 4000384 | 7/1991 | Fed. Rep. of Germany . |
| 696329 | 12/1930 | France . |
| 707677 | 7/1931 | France . |
| 743166 | 3/1933 | France . |
| 846990 | 5/1943 | France . |
| 1437658 | 3/1966 | France . |
| 2655378 | 6/1991 | France . |
| 348947 | 6/1937 | Italy . |
| 472746 | 9/1937 | United Kingdom . |

Primary Examiner—Tony M. Argenbright
Assistant Examiner—M. Macy
Attorney, Agent, or Firm—Collard & Roe

[57] ABSTRACT

An opposed piston internal combustion engine comprises an output shaft, at least one cylinder, at least one pair of first and second opposed pistons slidable in said cylinder, a first cam connected to the output shaft and a first cam follower assembly connecting the first piston to the first can, a second cam connected to the output shaft and a second cam follower assembly connecting the second piston to the second cam, an intake valve comprising a slide valve obtained by first piston covering and uncovering an intake port provided in a sidewall of the cylinder at a first end of the cylinder, and an exhaust valve comprising a slide valve obtained by the second piston covering and uncovering an exhaust port provided in the sidewall of the cylinder at a second opposite end of the cylinder, the first and second cams cooperating to provide a cycle of relative movements between the pistons and of valve actions giving rise to five cycles of (i) intake, (ii) compression, (iii) expansion, (iv) exhaust, and (v) return, during which the opposed pistons travel towards a same end of the cylinder.

23 Claims, 14 Drawing Sheets

INTERNAL COMBUSTION ENGINE HAVING OPPOSED PISTONS

This is a continuation-in-part of copending application Ser. No. 07/758,615 filed on Sep. 12, 1991, now abandoned.

FIELD OF THE INVENTION

The present invention relates to an internal combustion engine using a five cycle operation consisting of a conventional four cycle operation (intake, compression, expansion and exhaust) plus a fifth cycle (return portion). This engine having opposed pistons in which the intake valve means and the exhaust valve means are replaced by two opposed pistons acting as slide valves. The invention relates further to an internal combustion engine having opposed pistons in which both of the two opposed pistons are connected to an output shaft of the internal combustion engine by means of cams and cam follower assemblies.

BACKGROUND OF THE INVENTION

In the prior art opposed piston internal combustion engines, two pistons are slidable in a cylinder in an opposed fashion such that they share the same combustion chamber. Both pistons are connected via a connecting rod to a separate crankshaft in such a manner that the pistons reciprocate within the cylinder to vary the combustion chamber volume according to a predetermined cycle.

U.S. Pat. No. 2,486,185 describes an opposed piston internal combustion engine having two separate cranks geared together with a 2:1 ratio. The cycle described synchronizes the power stroke of the two opposed pistons for very large expansion of the combustion gases. U.S. Pat. No. 3,485,221 describes an opposed piston engine having two pistons which are connected to separate crankshafts turning at the same speed and out of phase by 45° with respect to one another, in which the pistons act as slide valves in a two-stroke engine configuration. The opposed piston engine is said to provide high torque output on the crankshafts. U.S. Pat. No. 4,010,611 describes an opposed piston engine wherein both pistons are connected to separate crankshafts and one piston turns at twice the rotational speed of the other. At the beginning of the compression cycle the two pistons are in phase, and the opposed piston motor allows for a maximum expansion and a complete exhaust of the combustion chamber.

Other patents of the prior art show the use of cams in replacement of the conventional connecting rod and crankshaft assembly, as can be found in French patents 707,677 and 846,990 with addition 51,826, United Kingdom patent 472,746, U.S. Pat. Nos. 1,808,664, 1,796,453, 4,520,765 and 4,974,555.

Although the prior art opposed piston engines allow for a variable volume during the expansion or exhaust phases in such a way that efficiency of the engine can be improved, it is required in the case of a four-cycle engine according to the prior art to provide separate valve means for controlling the intake and exhaust valves. Crankshaft engines are required to work within the confines of the sinusoidal displacement of the opposed pistons. This is not the case with cam engines, but the gain in selectable displacement curves of the pistons are eclipsed by the extensive and expensive mechanics required.

In all motors having a given work output, the indicated power is directly proportional to the volumetric efficiency of the engine. Therefore, it is desirable that the intake valves be as large as possible. Furthermore, a large volumetric efficiency can reduce the losses associated with the intake cycle. It is also desirable to minimize the temperature in the tubing, orifices and intake valves in order to limit the heating of the air/fuel mixture. Unfortunately, in existing four-cycle motors the size of the intake valve is limited and the valve seats operate at temperatures great much larger than the cooling liquid. The exhaust valves also affect the volumetric efficiency. They are generally much smaller than the intake valves. The size of the exhaust valves can be reduced to 50% of that of the intake valves. Still, the choice involves a compromise since the work lost during the exhaust increases when the dimension of the exhaust valves is reduced. Therefore the valves always restrict the volumetric efficiency in addition to dynamically limiting the motor speeds due to their inertia. The only cam engine (U.S. Pat. No. 4,520,765) with a four-cycle operation having a large exhaust port in the cylinder wall requires a scavenging of the burnt gases, hence losing all the advantages of such a port.

It is also desirable to carry out the combustion cycle in a constant volume chamber and or at constant pressure to augment thermal efficiency.

The thermal losses during combustion and expansion also reduce the efficiency of the cycle. The greater part of these losses can be attributed to the loss of heat during combustion.

Losses due to friction also affect the efficiency of the engine and 60% of these losses are produced by the friction of the piston rings.

Also, the energy lost in the exhaust gases can be used to increase the thermal efficiency of this cycle. Furthermore, the construction of conventional engines and cam engines requires many stationary and moving parts. This increases the cost of manufacture and reduces reliability and durability of those engines.

It is an object of the present invention to overcome totally or in part the drawbacks of the prior art engines as mentioned above.

SUMMARY OF THE INVENTION

The first object of this invention is to replace the intake and exhaust valves required to produce a four cycle operation. This may be achieved with a five cycle opposed piston engine comprising the conventional four cycles of intake, compression, expansion and exhaust, plus a return portion making the fifth cycle. The expansion portion consisting of two subportions, burn and power stroke. This five cycle operation is applied to an opposed piston engine, in which the opposed pistons share a common volume in the cylinder and their movements are controlled by cams, wherein the piston acts as slide valves controlling the opening and closing of the intake an exhaust ports.

Another object of the present invention is to significantly increase the volumetric efficiency of the engine while reducing the energy required for the exhaust. Since the intake and exhaust ports can be made as large as required and the displacement curves of the pistons can be tailored to any design shapes by the use of cams, this will provide a volumetric efficiency increase with the previously described arrangement of the first object.

Another object of the invention is to provide a constant volume and/or constant pressure combustion. The thermal efficiency of the engine is increased due to the constant volume and/or constant pressure combustion. Another object is to provide a larger expansion volume than the intake volume. This larger expansion volume allows a recuperation of the large part of the energy which is normally lost with the exhaust gases. Another object of the present invention is to enable the positioning of the combustion chamber anywhere in the cylinder, thus by moving the chamber away from the intake port, the air/fuel mixture is heated less, to achieve this, the present invention replaces the crankshaft and connecting rod linkages and the axial cams of the prior art opposed piston engines by special disk, conical or a spherical cams having an extra groove with swivel-oscillating roller follower assemblies in order to provide a five cycle operation. Another object is to reduce the thermal losses during combustion, to achieve this, the portion of the cylinder where the combustion takes place is insulated with a material such as a ceramic material.

According to the invention there is provided an internal combustion engine comprising an output shaft; at least one cylinder; at least one pair of first and second opposed pistons slidable in said cylinder, said pair of pistons defining a space within said cylinder; first connecting means connecting the first piston to the output shaft for reciprocal motion in said cylinder, the first connecting means comprising a first cam connected to said output shaft, the first piston being moved by a first cam follower assembly in contact with said first cam; second connecting means connecting the second piston to the output shaft for reciprocal motion in said cylinder, the second connecting means comprising a second cam connected to said output shaft, the second piston being moved by a second cam follower assembly in contact with said second cam; intake valve means comprise a slide valve obtained by the said first piston covering and uncovering the intake port provided in the side wall of the cylinder at a first end of the cylinder; exhaust valve means comprise a slide valve obtained by the second piston covering and uncovering the exhaust port provided in the side wall of the cylinder at a second opposite end of the cylinder; and the first and second connecting means cooperating to provide a cycle of relative movements between the pistons and of valve actions giving rise to intake, compression, expansion, exhaust and a return portion during which the first and second pistons return towards the first end of the cylinder.

In a first preferred embodiment, the first and second connecting means preferably comprise a first and second disk cam having an extra face-groove respectively and a first and second swivel-oscillating roller cam follower assembly respectively for making the cam linkage between the output shaft and the first and second pistons solid as the first and second pistons reciprocate within the cylinder. Preferably, the disk cams, are shaped such that during the burn subportion of the cycle, the pistons remain stationary so that the combustion takes place under conditions of constant volume. The cams may also be shaped to provide a constant pressure combustion, or add other portions like an intercooling portion, where the engine draws a fresh charge and exhausts it, in order to cool the inside walls of the cylinders or to make a braking action. In the first preferred embodiment, the cylinder is preferably a segment of a toroid, and the first and second cam follower assemblies comprise first and second pivot arms connected to the first and second pistons respectively, the first and second pivot arms pivoting about the center of the toroid segment in the same plane as the cams. The use of a toroidal cylinder reduces to a minimum the number of parts required for the construction of the engine, and provides floating pistons, which reduces the piston ring friction.

In a second preferred embodiment, the first and second connecting means comprise a first and second conical or spherical cam having an extra groove respectively and a first and second swivel-oscillating roller cam follower assembly respectively for making the cam linkage between the output shaft and the first and second pistons solid as the first and second pistons reciprocate within the cylinder. Preferably, the conical or spherical cams are shaped such that during the burn subportion of the cycle, the pistons remain stationary so that the combustion takes place under conditions of constant volume. The cams may also be shaped to provide a constant pressure combustion, or add other portions like an intercooling portion, where the engine draws a fresh charge and exhausts it, in order to cool the inside walls of the cylinders or, to make a braking action. In the second preferred embodiment, the cylinder is preferably a segment of a toroid, and the first and second cam follower assemblies comprise first and second pivot arms connected to the first and second pistons respectively, the first and second pivot arms pivoting about a center of the toroid segment in a plane perpendicular to the cams.

BRIEF DESCRIPTION OF THE DRAWINGS

The invention will become better understood as a result of the following description of the preferred embodiments, with reference to the appended drawings in which.

DETAILED DESCRIPTION OF THE PREFERRED EMBODIMENTS

Figure 1A:
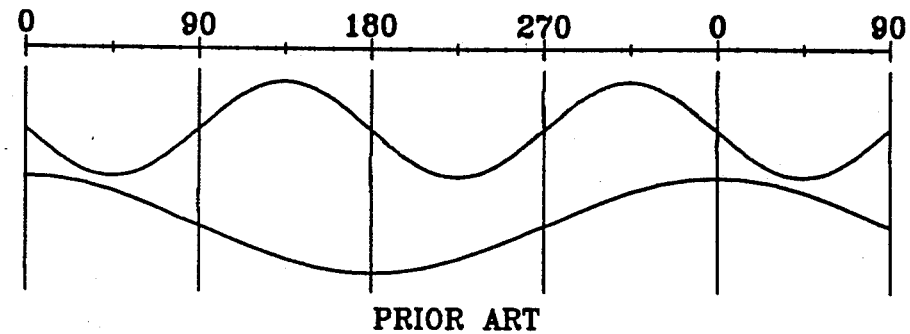
FIGS. 1A, 1B, 1C and 1D show four graphs of the prior art opposed piston motions.
Figure 1B:
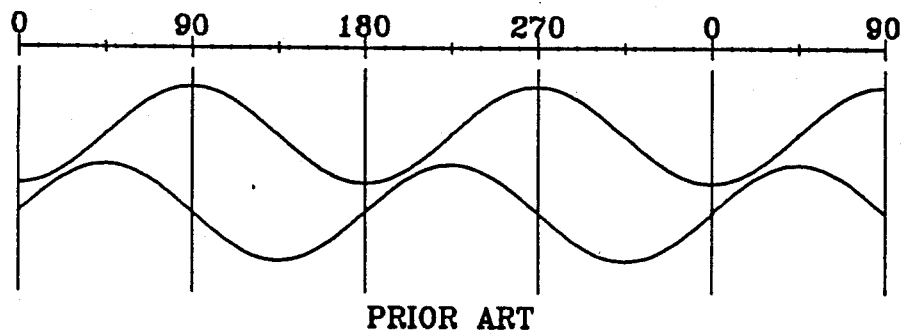
Figure 1C:
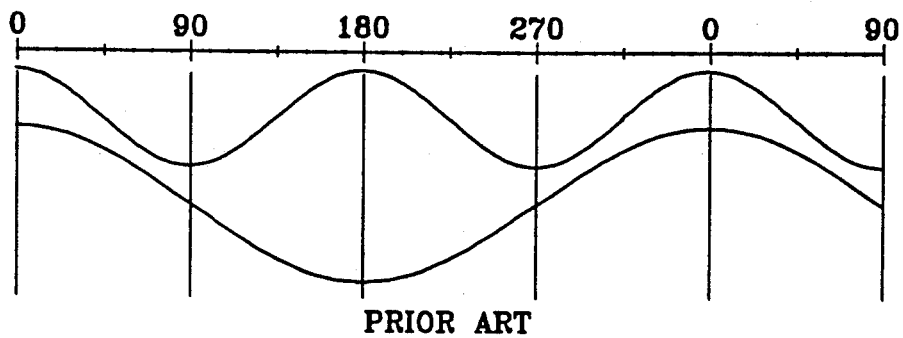
Figure 1D:
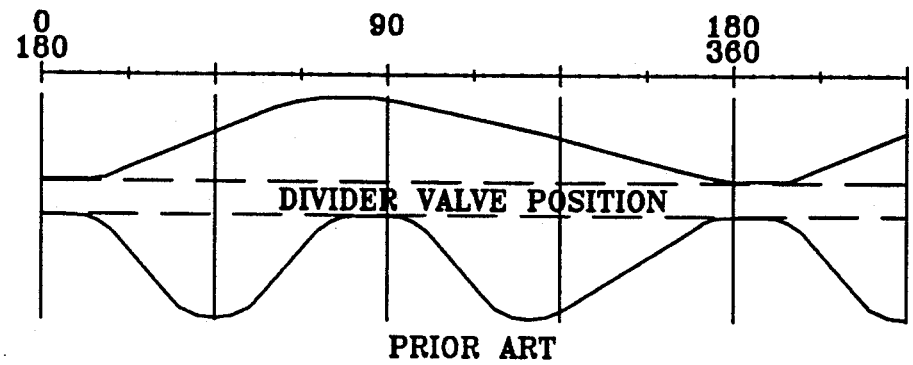

FIGS. 1A, 1B, 1C and 1D show prior art opposed prior displacement cycle curves. FIG. 1A shows the piston displacement cycle curve of U.S. Pat. No. 2,486,185 to M. Mallory; FIG. 1B shows the curve of U.S. Pat. No. 3,485,221 to R. S. Feeback; FIG. 1C shows the curve of U.S. Pat. No. 4,010,611 to J. E. Zachery; and FIG. 1D shows the curve of U.S. Pat. No. 4,520,765 to A. Gerace.

Figure 2:
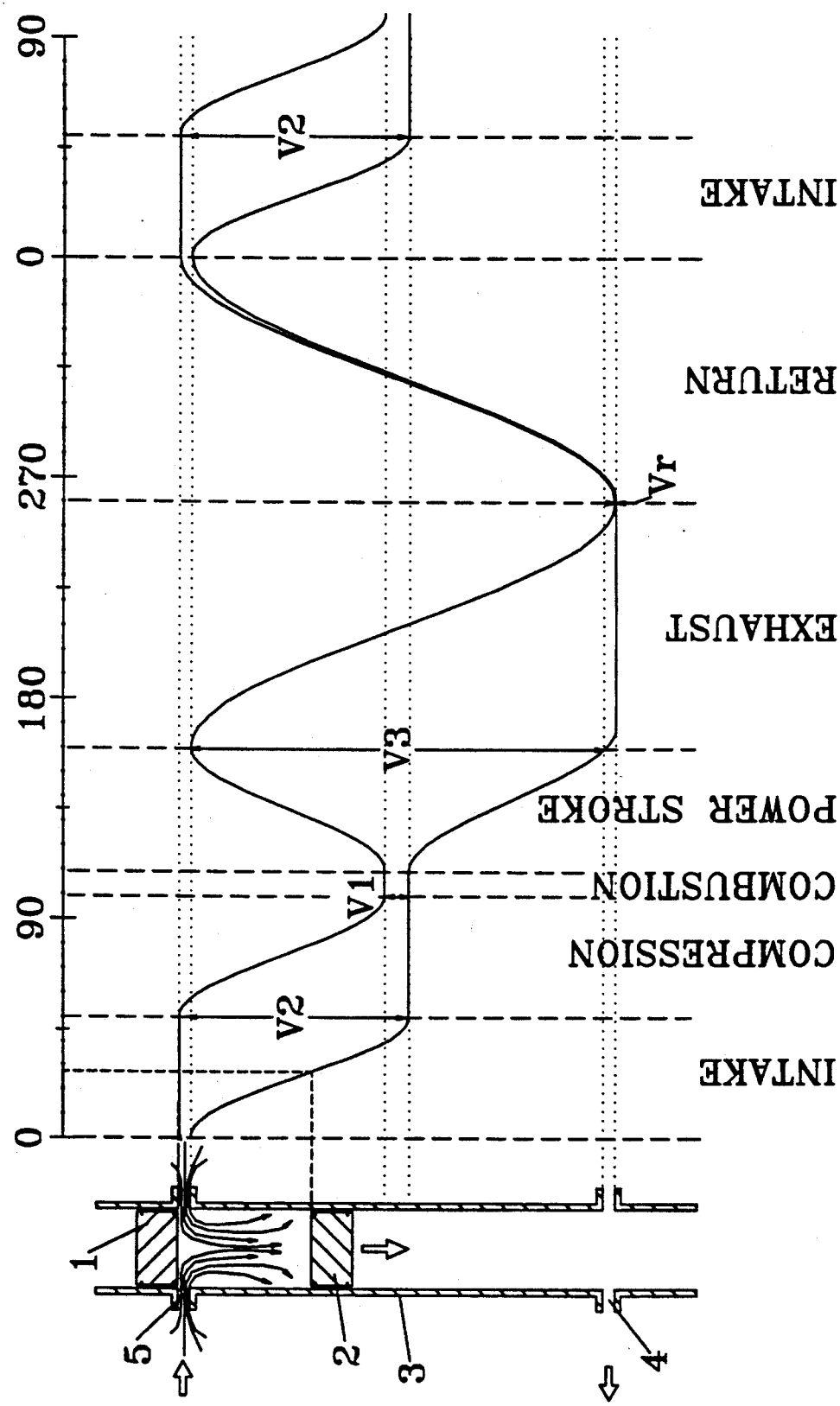
FIG. 2 illustrates graphically the piston movement of the five cycle operation.
Figure 3:
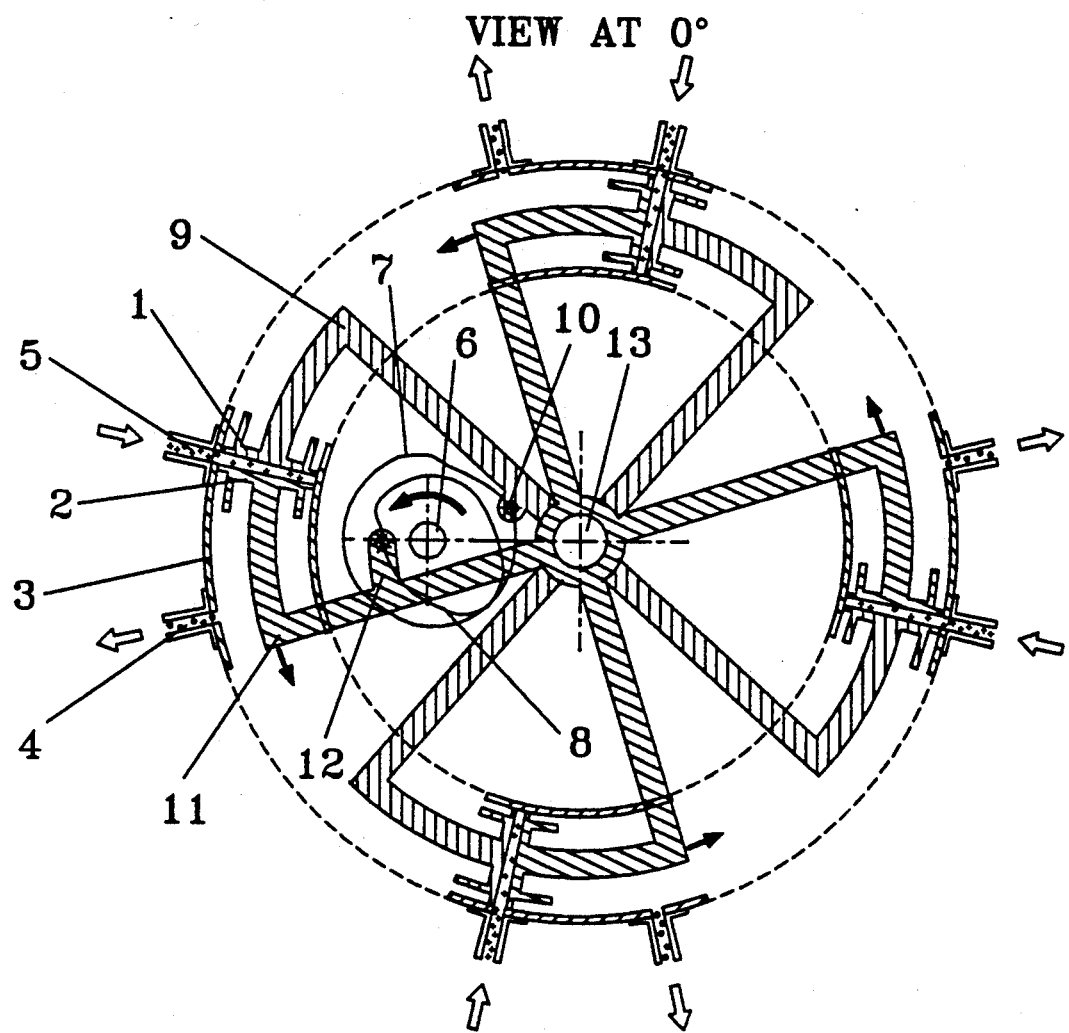
FIG. 3 is a cross-sectional view of the motor according to the first preferred embodiment at an initial position, namely at the beginning of the intake portion of the cycle.
Figure 4:
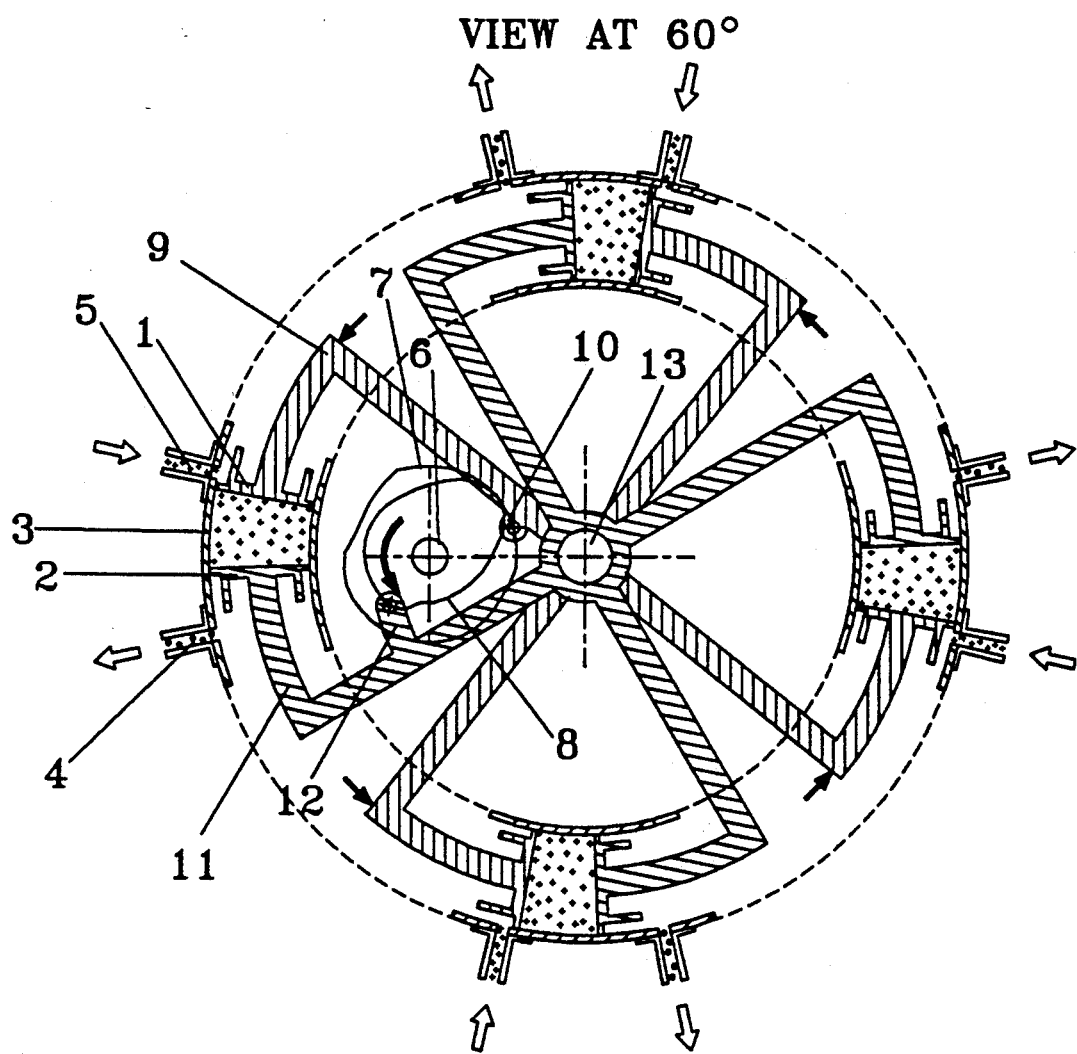
FIG. 4 shows a cross-section of the motor according to the first preferred embodiment at the beginning of the compression portion of the cycle.
Figure 5:
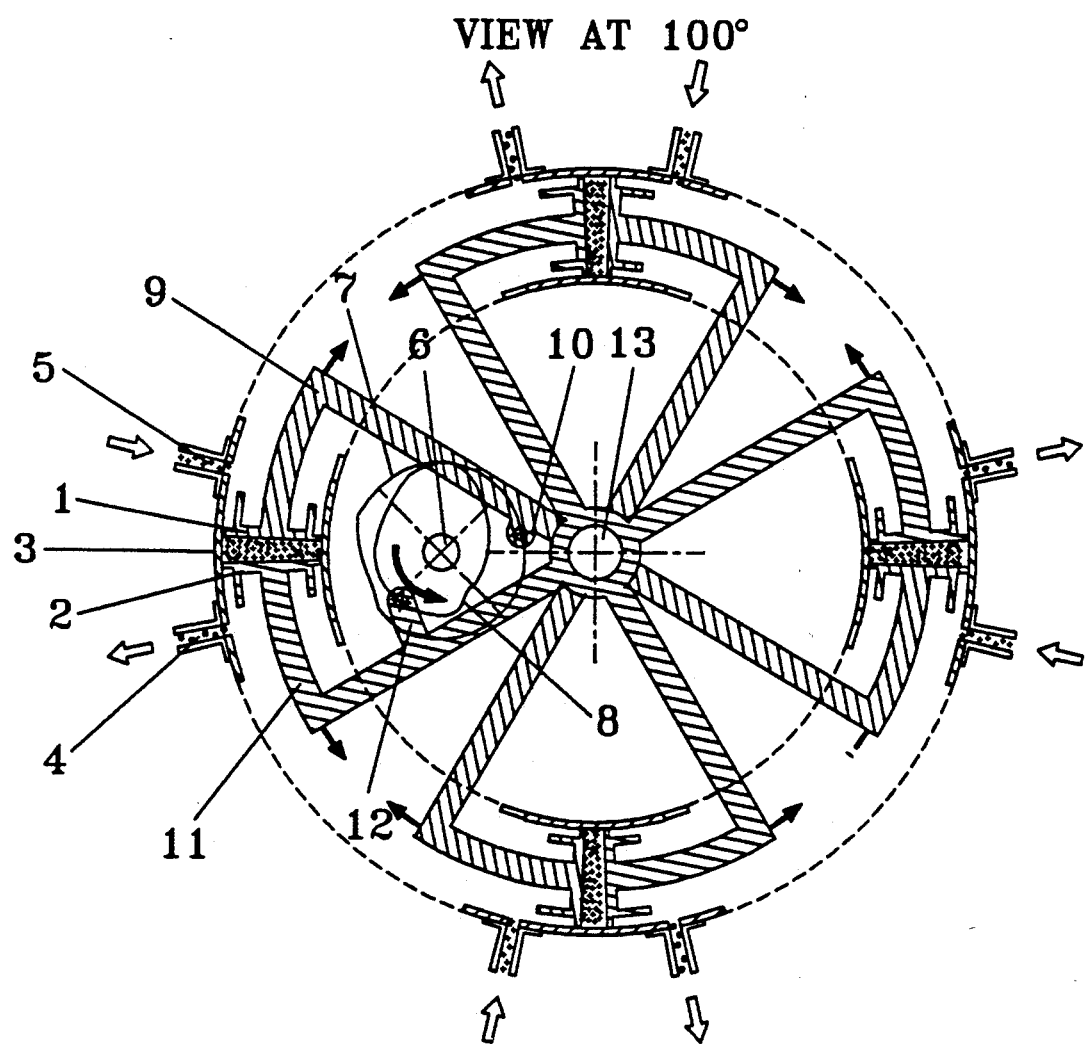
FIG. 5 is a cross-sectional view of the motor according to the first preferred embodiment at the beginning of the burn subportion of the cycle.
Figure 6:
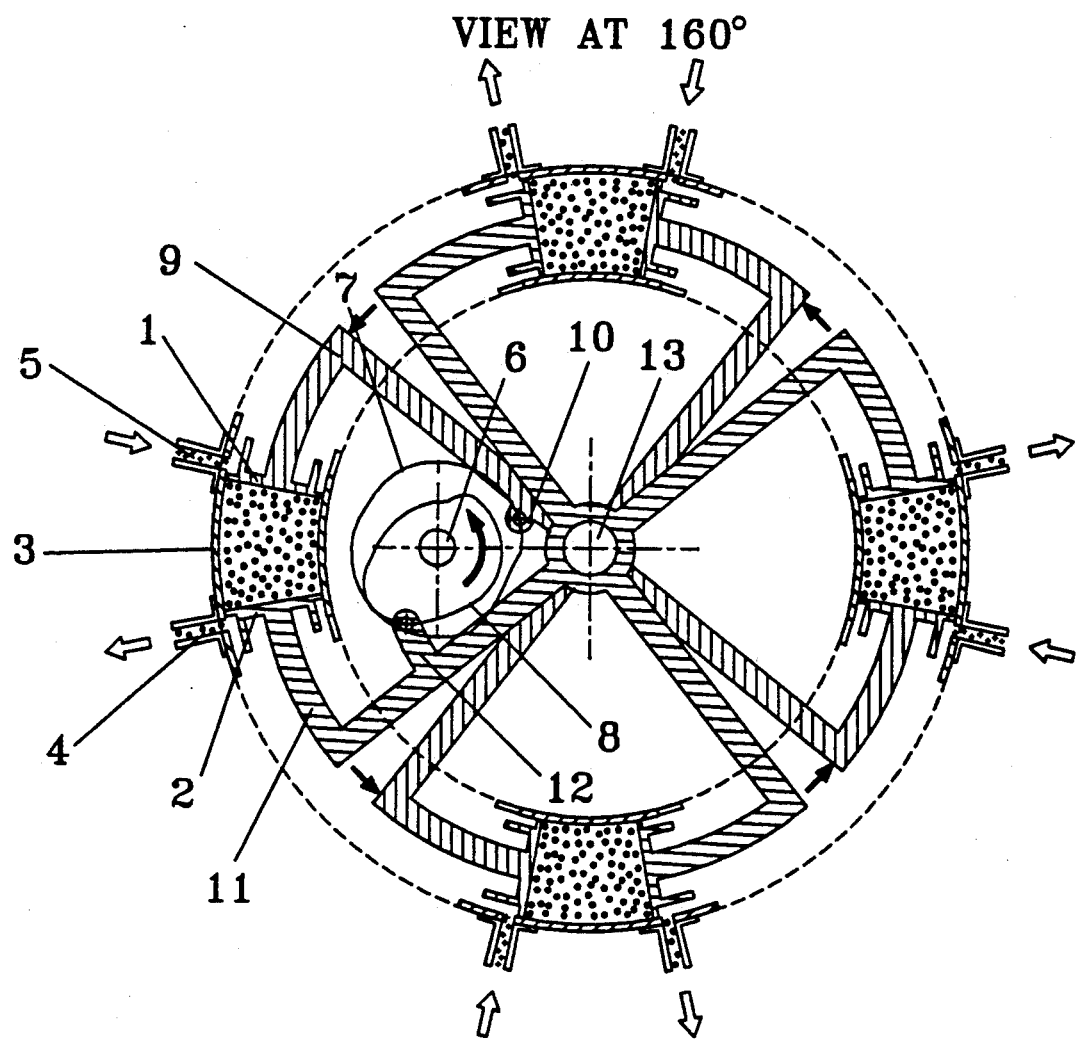
FIG. 6 shows a cross-sectional view of the motor according to the first preferred embodiment at the end of the power stroke and just prior to the exhaust portion.
Figure 7:
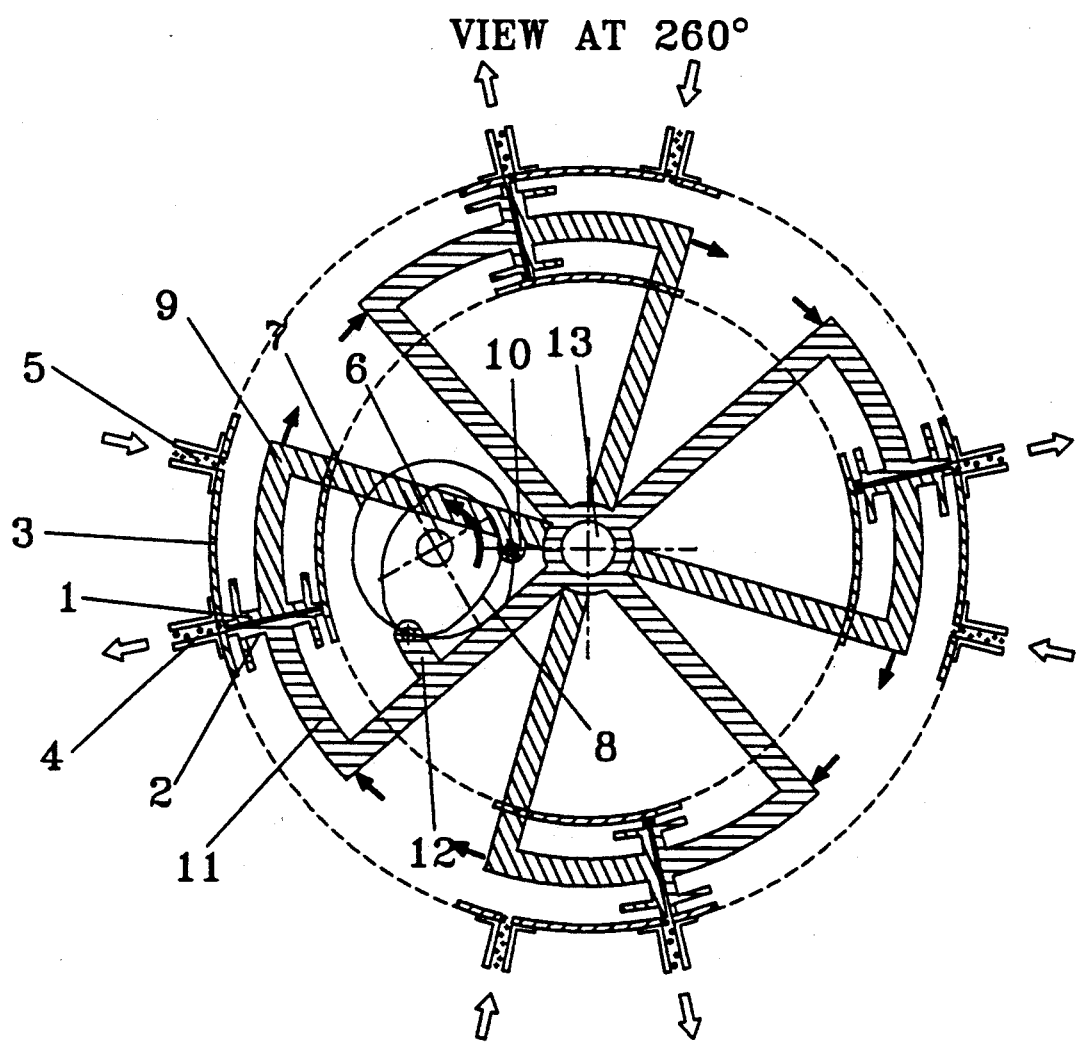
FIG. 7 shows a cross-sectional view of the motor according to the first preferred embodiment at the end of the exhaust portion and beginning of the return portion of the cycle.

As shown in FIG. 2 and FIG. 3, piston (1) is able to open and close intake port (5), and piston (2) is able to open and close exhaust port (4). Piston (1) and piston (2) are both slidable in cylinder (3) and are each connected to output shaft (6) by means of a first cam (7) and a second cam (8) connected to a first cam follower assembly (9) (10) and a second cam follower assembly (11) (12) respectively. In the first preferred embodiment, the motor comprises four toroidal segment cylinders (shown linearly for simplicity of illustration in FIG. 2) in which the pistons and pistons arms pivot about a bearing (13). of course, any number of cylinders may be arranged in the motor and they may be assembled as multi-stage sections of groups of pistons on the same output shaft (6).

Cams (7) and (8) are shaped such that the displacement of the pistons (1) and (2) follows a variable amplitude path in which the intake volume V2 is greater than the compression volume V1, and the maximum power stroke volume V3 is greater than volume V2. Also the residual volume Vr is as small as piston clearance between piston (1) and piston (2) can be reduced. Since both pistons (1) and (2) are connected to the output shaft (6) by means of cams (7) and (8) and cam follower assemblies (9) (10) and (11) (12), this eliminates the need for a half speed shaft required to control valve means in a conventional four cycle engine. In the first preferred embodiment, it is desirable that the cams (7) and (8) be formed to provide a reduced intake and compression portion of the cycle, to add a combustion or burn subportion to the cycle in which pistons (1) and (2) remain substantially stationary with respect to one another, and to add possibly a constant pressure combustion subportion to the cycle. This provides a longer power stroke subportion of the cycle, and also provides sufficient time for the exhaust portion given that the full expansion volume V3 is significantly larger than the intake volume V2, and the residual volume Vr during exhaust is caused to be minimal such that all residual burn gases are effectively exhausted from the space between pistons (1) and (2) before fresh intake gases are brought in during the intake portion just after the return portion.

Preferably the profiles of cams (7) and (8) are such that, as shown in FIG. 2, an initial portion takes place during the first 50° of the cams (7) and (8) in which piston (1) uncovers intake port (5) while piston (2) moves to a midpoint in toroidal cylinder (3), thereafter during a 50° portion of the cams (7) and (8), piston (1) moves towards piston (2) thus closing intake port (5) and reducing the volume of the space between pistons (1) and (2) from V2 to V1 (the compression ratio being V2:V1), then during a 10° portion of cams (7) and (8) pistons (1) and (2) remain stationary during a burn subportion of the cycle. The burn subportion of the cycle may be initiated by a spark plug (not shown) or by virtue of the compression ratio between V2 and V1 which would spontaneously cause combustion of the compressed gases. After the burn subportion, a simultaneous movement of piston (1) and piston (2) towards their respective ends of cylinder (3) takes place during a power stroke subportion, part of which can include a constant pressure combustion subportion, at which time the space between pistons (1) and (2) has reached a maximum of V3, and then piston (2) uncovers exhaust port (4) while piston (1) travels the length of cylinder (3) towards piston (2) causing a full exhaust during a 100° portion of cams (7) and (8), and during a remaining 100° portion of cams (7) and (8), pistons (1) and (2) return to their initial position near intake port (5). The patterns of each cam can be reproduced more than once for a full revolution of the cam, this will reduce the output shaft speed and increase the output couple of the engine, easing transmission designs.

Figure 8:
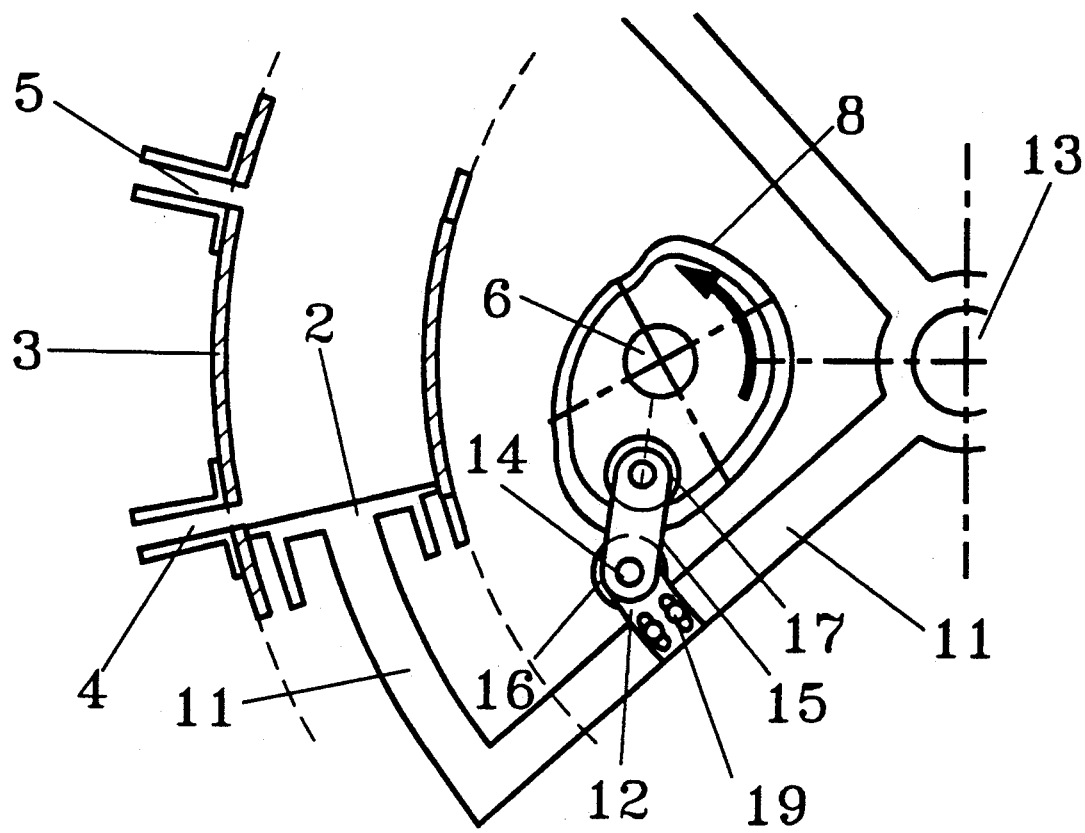
FIG. 8 illustrates an enlarged view of the disk cam and swivel-oscillating cam follower assembly according to the first preferred embodiment.
Figure 9:
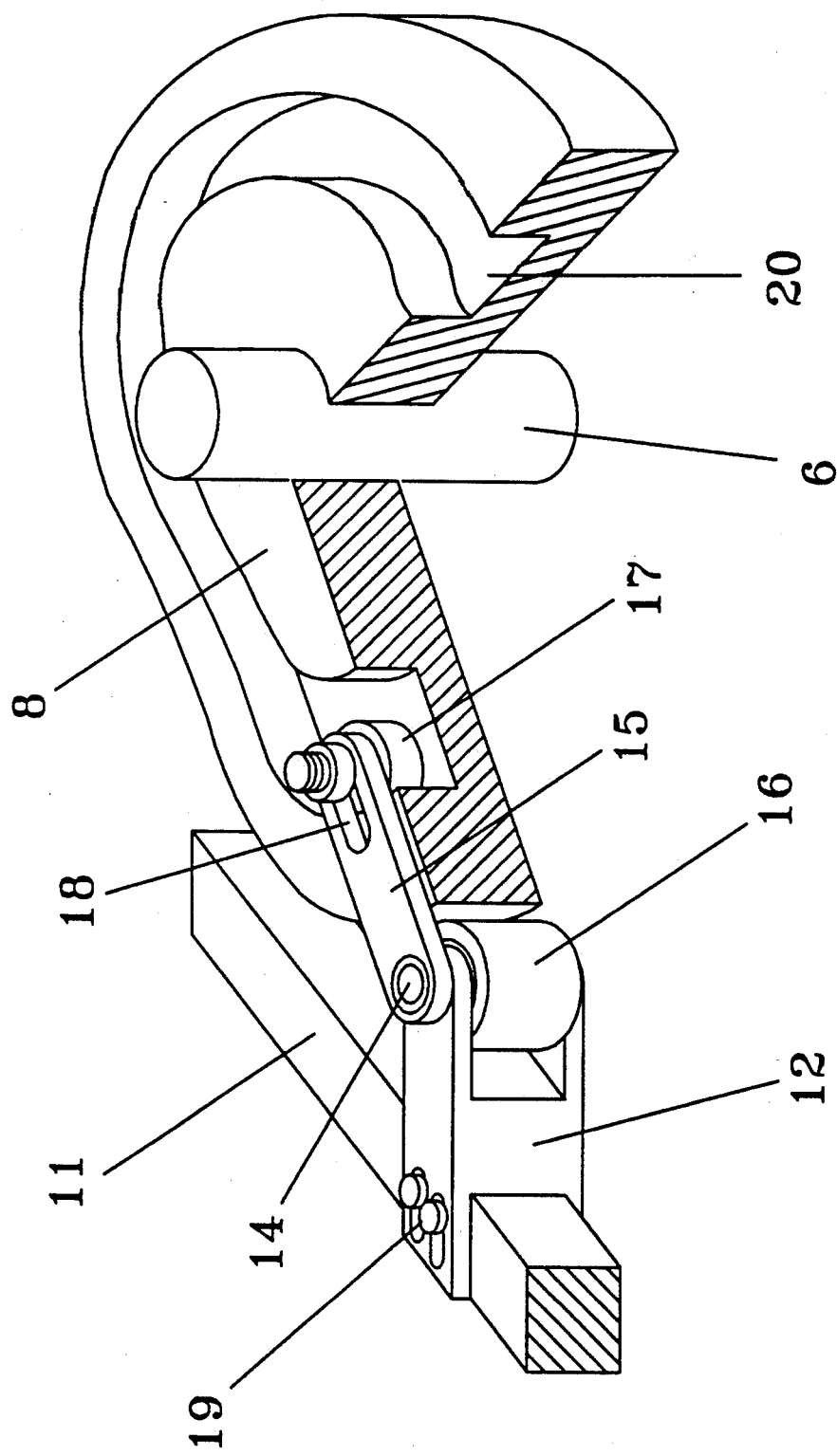
FIG. 9 shows an isometrical view of the special disk cam having an extra face-groove and swivel-oscillating roller cam follower assembly according to the first preferred embodiment.

FIGS. 3 through 7 illustrate the various stages of the motor according to the first preferred embodiment. FIGS. 8 and 9 show details of the first preferred embodiment, in which cam (8) is provided with an extra face-groove (20) and the swivel-oscillating roller cam follower assembly (14-18) which makes contact with cam (8) is interconnected via arm (11) to an extension (12) of arm (11) at 90° or any angle about pivot (13). The extension (15) is able to swivel about axis (14) maintaining roller (17) equidistant from the contact point of roller (16) to provide a solid mechanical linkage. In the arrangement shown, as output shaft (6) is rotated in either direction, arm (11) connected to pistons (2) of all four toroidal cylinders will be moved in accordance with the profile on second cam (8) and face-groove (20) without any play between cam (8) and the yoke-mounted roller (16) of cam follower (12) and the overhang-mounted roller (17) of swivel-oscillating cam follower (15) respectively. The extension (12) and yoke-mounted roller (16) can be positioned to work in extension during the expansion portion of the cycle, as in FIG. 3 to 8, or preferably in compression for greater strength. Adjustment screws (19) and slot (18) or equivalent allow the rollers (16) and (17) to be adjusted to compensate for wear of the cam (8). FIG. 9 shows an isometrical view of the previous arrangement.

Of course, cam (7) is also to be provided with its own extra face-groove, and swivel-oscillating roller cam follower assembly interconnected with the first cam follower assembly (9) and extension (10) is to be provided for effecting movement of piston (1) in cylinder (3) as output shaft (6) is turned. As shown in FIG. 3 through 7, first and second cams (7) and (8) may be provided along with their respective cam follower assemblies in a side by side relationship, or one of the cam and cam follower assembly may be provided on an opposite side of the motor for a more compact arrangement in which the opposite cam and cam follower assembly is rotatably connected with output shaft (6).

Figure 10:
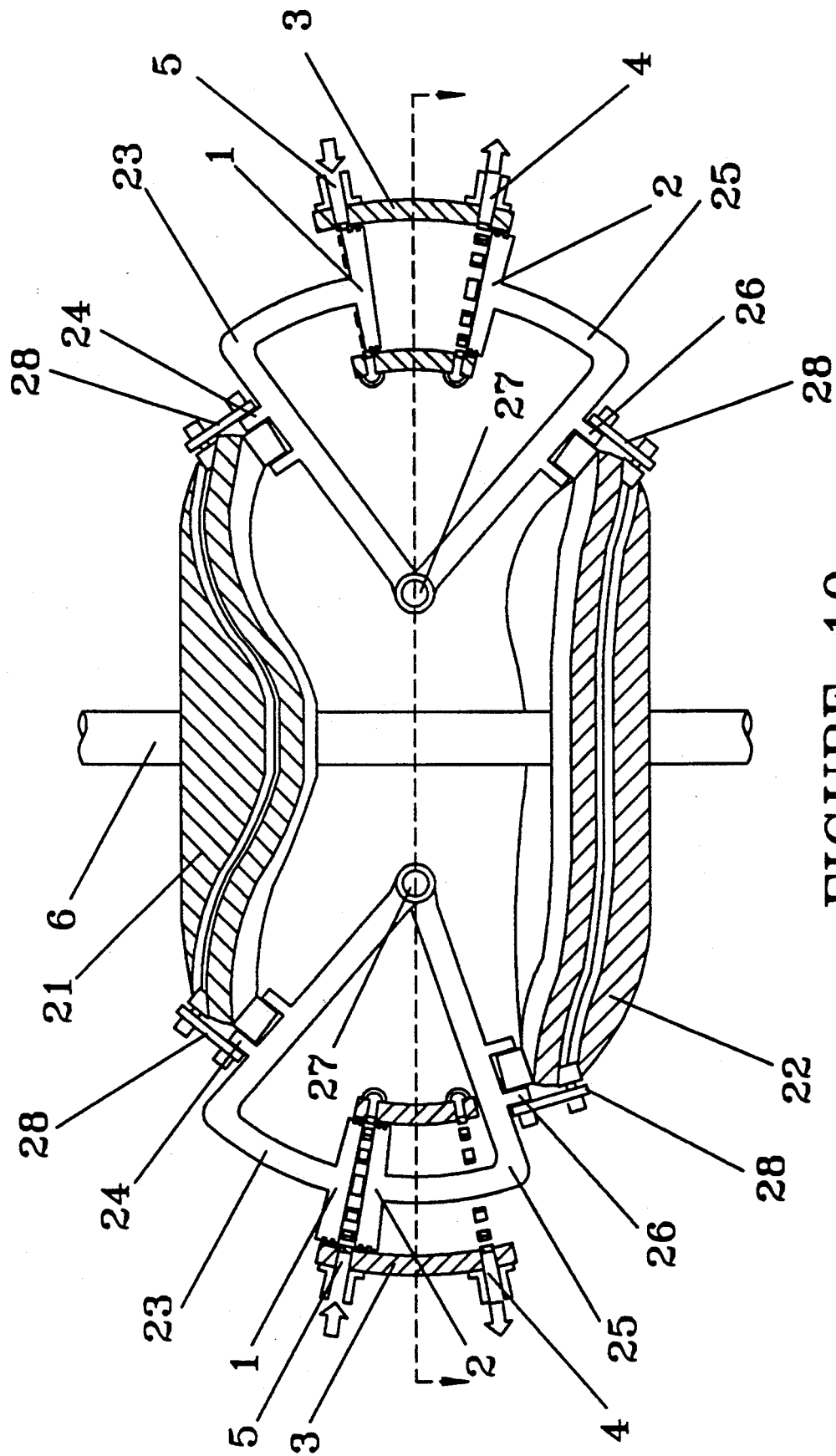
FIG. 10 shows a cross-sectional view of the motor according to the second preferred embodiment.
Figure 11:
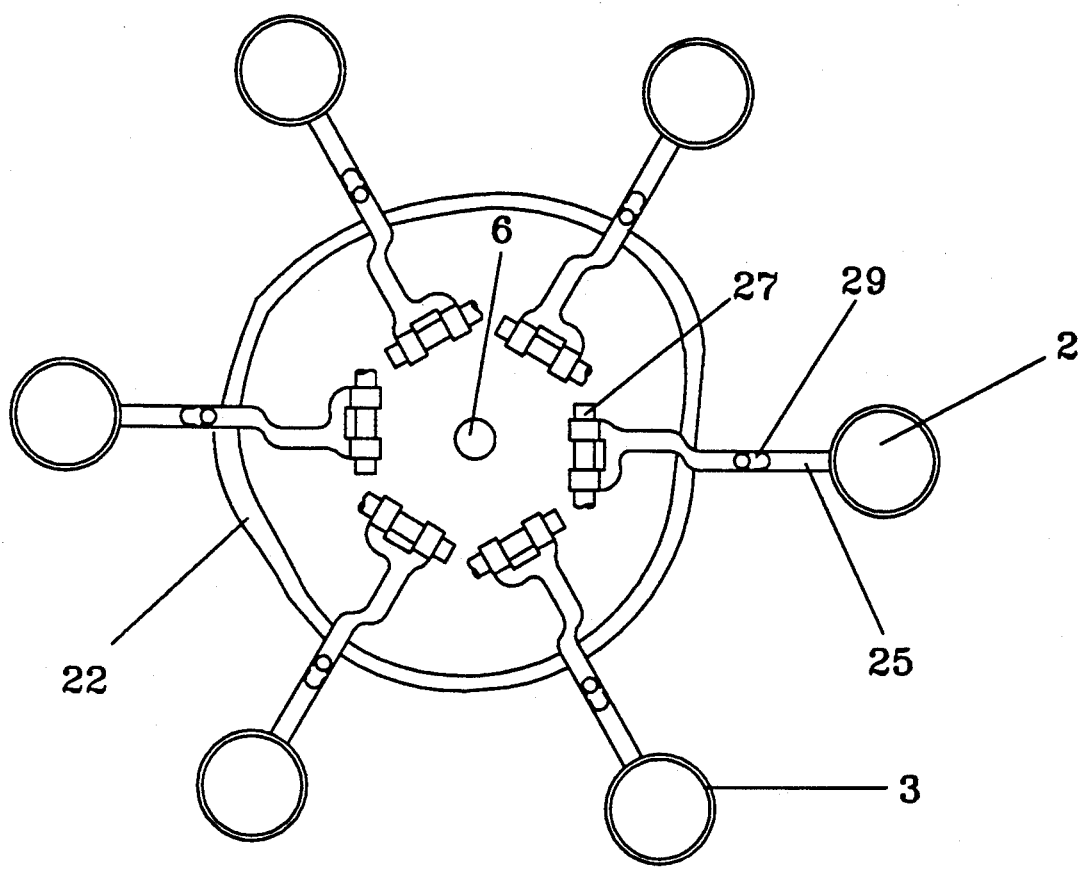
FIG. 11 shows another cross-sectional view of the motor according to the second preferred embodiment with a plurality of cylinders.

In the second preferred embodiment, as shown in FIG. 10 and FIG. 11, pistons (1) are able to open and close intake ports (5), and pistons (2) are able to open and close exhaust ports (4). Pistons (1) and pistons (2) are all slidable in cylinders (3) and are each connected to output shaft (6) by means of a first cam (21) and a second cam (22) connected to first cam follower assemblies (23) (24) and second cam follower assemblies (25) (26) respectively. The motor comprises two toroidal segment cylinders (3) equally spaced from the longitudinally extending output shaft (6), in which the pistons (1) and (2) and pistons arms (23) and (25) pivot about center shafts (27), whose rotational axis form an angle of 90° with the output shaft axis (6). The arrangement of the second preferred embodiment allows the same cams to drive a plurality of pistons contained in cylinders equally spaced from the output shaft. Of course, any number of cylinders may compose the motor and they may be assembled as multi-stage sections of groups of pistons on the same output shaft (6).

FIG. 11 shows a plan view about a line as shown in FIG. 10 with a plurality of cylinders. Cams (21) and (22) are shaped to produce exactly the same cycle as cams (7) and (8). Cams (21) and (22) have profiles that are equivalent to cams (7) and (8), in regards to the angles occupied by the various portion of the cycle.

Figure 12:
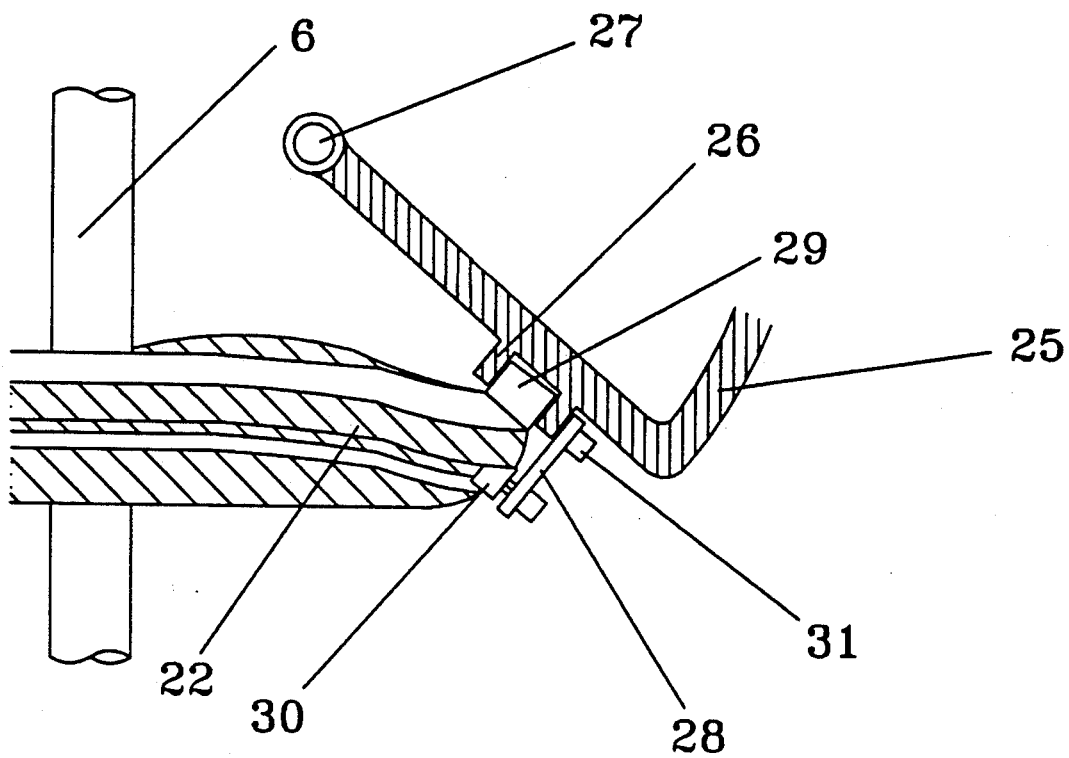
FIG. 12 illustrates an enlarged view of the special conical or spherical cam having an extra groove and swivel-oscillating roller cam follower assembly according to the second preferred embodiment.
Figure 13:
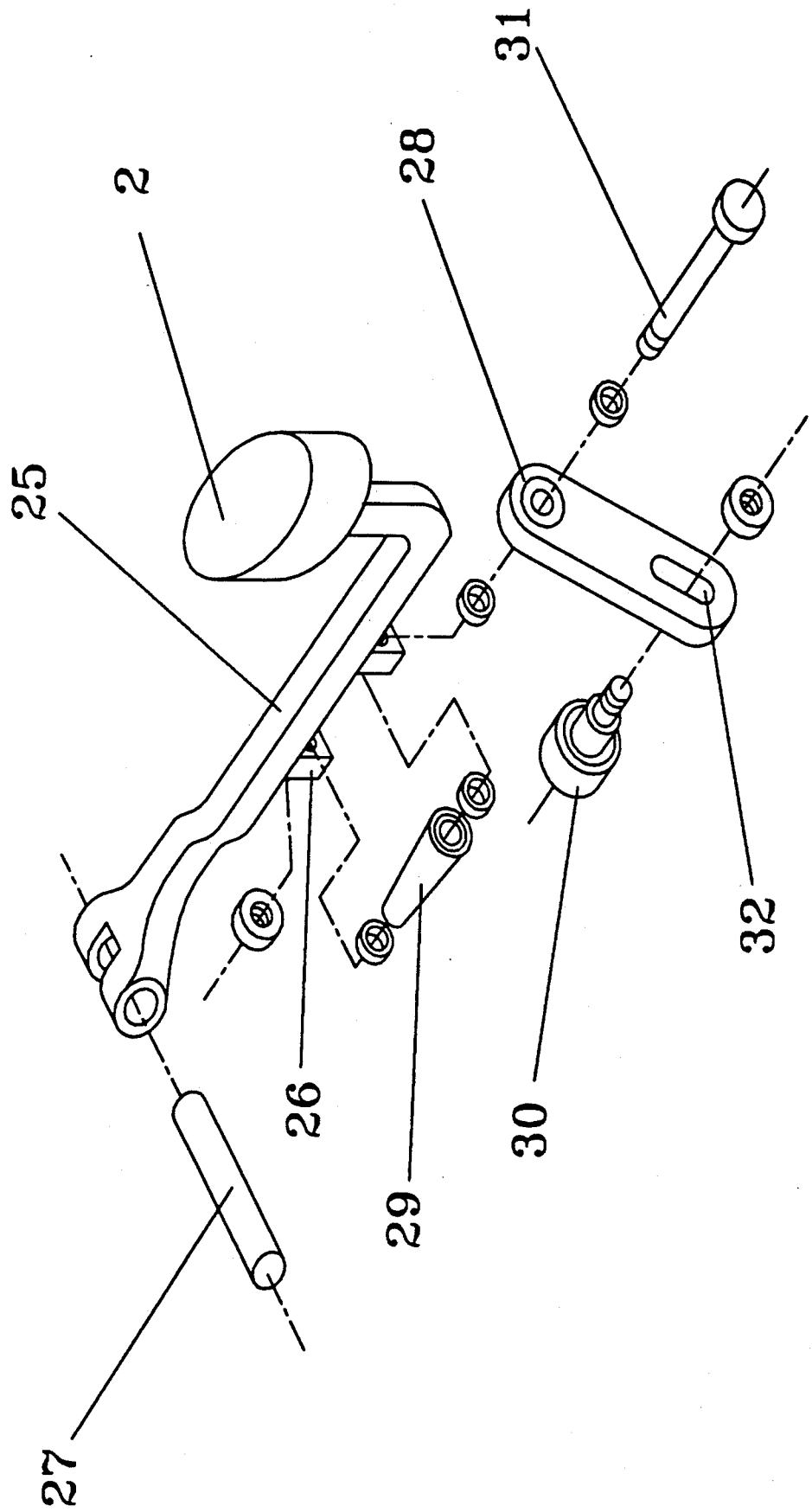
FIG. 13 shows an isometrical view of a piston and swivel-oscillating roller ca-m follower assembly according to the second preferred embodiment.

FIGS. 12 and 13 show details of the second preferred embodiment, in which cam (22) is provided with an extra groove and the swivel-oscillating roller cam follower assembly (28,30-32) which makes contact with cam (22) is interconnected via arm (25) to an extension (26) of arm (25). The extension (28) is able to swivel about axis (31) maintaining roller (30) equidistant from the contact point of roller (29) to provide a solid mechanical linkage. In the arrangement shown, as output shaft (6) is rotated in either direction arm (25) connected to piston (2) of the toroidal cylinder will be moved in accordance with the profile on second cam (22) and the extra groove profile without any play between cam (22) and the roller (29) of cam follower (26) and the roller (30) of the swivel-oscillating cam follower (28) respectively. Adjustment screws on extension (26) (not shown) and slot (32) or equivalent means allow the rollers (29) and (30) to be adjusted to compensate for wear of the cams (22). FIG. 13 shows an isometrical view of a piston (2) and cam follower assembly (25) (26) as well as swivel-oscillating roller cam follower assembly (28-31) according to the second preferred embodiment. The follower assemblies (25) (26) (29) and swivel-oscillating roller follower assembly (28,30-32) are the same for the first cam follower assemblies (23) (24) except that they are assembled upside down.

Of course, cam (21) is also to be provided with its own extra groove and swivel-oscillating roller cam follower assemblies interconnected with the first cam follower assemblies (23) and extensions (24) are to be provided for effecting movement of pistons (1) in cylinders (3) as output shaft (6) is turned.

Figure 14:
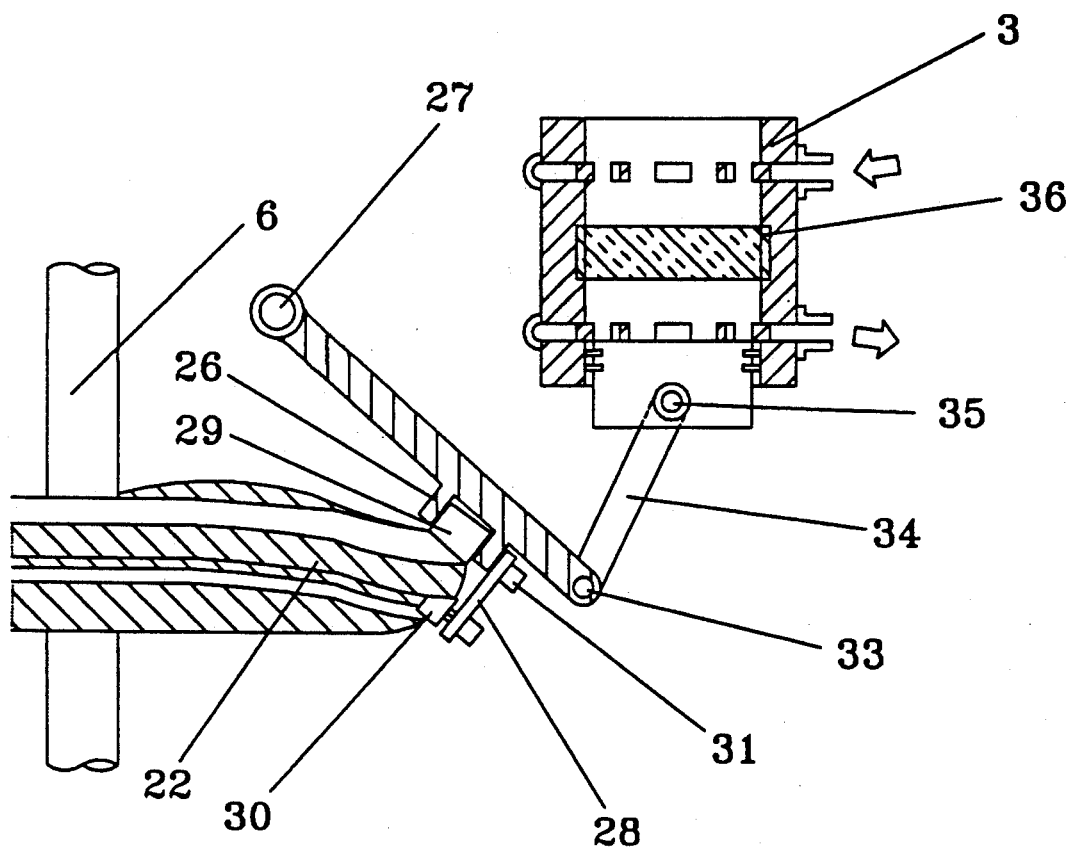
FIG. 14 shows a straight cylinder arrangement as an alternative to toroidal cylinder of the first and second preferred embodiment using the second preferred embodiment cam layout for illustration.

In a variant of the first or second preferred embodiments, as shown in FIG. 14, the cylinder (3) is of a more conventional straight cylindrical shape, as an alternative to toroidal cylinder. This however requires an addition of the following mechanical parts; arm pivot axis (33), connecting rods (34), piston pins (35). With this arrangement the pistons (1) and (2) are no longer floating, as in the first and second preferred embodiments, thus ring friction is greater. Pistons (1) and (2) need to be provided with a skirt to receive piston pin (35). Also ring-shaped insert pieces (36) of a ceramic material are inserted in the cylinder walls to insulate the combustion chambers in order to reduce the thermal losses. It this to be understood that those insert pieces can be extended to cover the entire inner cylinder walls, as they can be applied to first and second preferred embodiments, thus reducing the constraints on the cooling system of the engine. In FIG. 14 the second preferred embodiment cam layout is used for purpose of illustration.

Although the previous embodiments are described with special disk cams having an extra face-groove, as in the first preferred embodiment or spherical or conical cams also with an extra groove, as in the second preferred embodiments, it is to be understood that the present invention could be realized with other types of cam, such as double-end cams, having their rotational axes in any space orientation relative to the plane of the piston displacement.

It is also understood that the above description of the preferred embodiments is not intended to limit the scope of the present invention as defined in the appended claims.

What is claimed is:

1. An operating cycle for an internal combustion engine having opposed pistons slidable in a cylinder having an intake port at one end and an exhaust port at another end, comprising five portions; (i) intake, at a beginning of which said pistons are in an initial position in which one of said pistons uncovers said intake port and another of said pistons is near said one piston, and at an end of which said one piston covers said intake port an said other piston is near a midpoint between said intake and said exhaust ports, (ii) compression, during which said one piston moves toward said other piston, said pistons being near said midpoint, (iii) expansion, during which said pistons move towards said ends of said cylinder, (iv) exhaust, at a beginning of which said other piston uncovers said exhaust port and at an end of which said one piston has moved towards said other piston to expel gases in said cylinder, said expansion portion including burn and work subportions, and (v) a fifth return portion, during which the opposed portions travel towards said initial position.

2. An opposed piston internal combustion engine comprising:
    an output shaft;
    at least one cylinder;
    at least one pair of first and second opposed pistons slidable in said cylinder, said pair of pistons defining a space within said cylinder;
    first connecting means comprising a first cam connected to the output shaft and a first cam follower assembly connecting the first piston to the first cam;
    second connecting means comprising a second cam connected to the output shaft and a second cam follower assembly connecting the second piston to the second cam;
    intake valve means comprising a slide valve obtained by said first piston covering and uncovering an intake port provided in a sidewall of said cylinder at a first end of said cylinder; and
    exhaust valve means comprising a slide valve obtained by said second piston covering and uncovering an exhaust port provided in the sidewall of said cylinder at a second opposite end of said cylinder, the first and second connecting means cooperating to provide a cycle of relative movements between the pistons and of valve actions giving rise to five portions of said cycle: (i) intake, at a beginning of which said first piston uncovers said intake port and said second piston is near said first piston, and at an end of which said second piston has moved near a midpoint between said first and second ends, (ii) compression, during which said first piston moves toward said midpoint, (iii) expansion, during which said first and second pistons move towards said first and second ends respectively, (iv) exhaust, at a beginning of which said second piston uncovers said exhaust port and at an end of which said first piston travels towards said second piston to expel gases from said cylinder, and (v) return, during which said pistons both move towards said first end, said expansion portion including burn and work subportions.

3. Internal combustion engine as claimed in claim 2, wherein said first and second connecting means further comprise first and second complementary cams and first and second complementary cam follower assemblies, the first and second complementary cams and the first and second complementary cam follower assemblies cooperating with the first and second cams and cam follower assemblies to provide a solid mechanical linkage between the first and second pistons and the output shaft for reciprocal motion of the first and second pistons in said cylinder.

4. Internal combustion engine as claimed in claim 3, wherein said first and second complementary cams comprise a groove in each said first and second cams respectively, and said first and second complementary cam follower assemblies each comprise a maintaining roller for engaging an outside face of said groove of said first and second cams respectively, each said maintaining roller being pivotally connected to a corresponding one of said cam follower assemblies by an extension arm.

5. Internal combustion engine as claimed in claim 2, wherein said cylinder is a segment of a toroid, said first and second cam follower assemblies comprise first and second pivot arms connected to said first and second pistons respectively, said first and second pivot arms pivoting about a center of said toroid segment in the same plane as the rotational plane of said cams.

6. Internal combustion engine as claimed in claim 5, comprising a plurality of said cylinders and said pairs of first and second pistons all sharing the same toroidal center and located substantially in the same plane in which said pivot arms move, said first cam follower assembly being connected to all said first pistons, said second cam follower assembly being connected to all said second pistons.

7. Internal combustion engine as claimed in claim 6, wherein said first and second connecting means further comprise first and second complementary cams and first and second complementary cam follower assemblies, the first and second complementary cams and the first and second complementary, cam follower assemblies cooperating with the first and second cams and cam follower assemblies to provide a solid mechanical linkage between the first and second pistons and the output shaft for reciprocal motion of the first and second pistons in said cylinder.

8. Internal combustion engine as claimed in claim 7, wherein said first and second complementary cams comprise a groove in each said first and second cams respectively, and said first and second complementary cam follower assemblies each comprise a maintaining roller for engaging an outside face of said groove of said first and second cams respectively, each said maintaining roller being pivotally connected to a corresponding one of said cam follower assemblies by an extension arm.

9. Internal combustion engine as claimed in claim 2, wherein:
said intake portion of said cycle occupies approximately 50° of rotation of said first and second cams, during which the first piston uncovers said intake port and said second piston moves from said first end towards substantially a midpoint between said first end and said second end, increasing a volume of said space;
said compression portion of said cycle occupies approximately 50° of rotation of said first and second cams, during which the first piston moves towards the second piston while said second piston remains stationary;
said burn subportion of said cycle occupies approximately 10° of rotation of said first and second cams;
said work subportion of said cycle occupies approximately 50° of rotation of said first and second cams, during which said first and second pistons move towards said first and second ends respectively;
said exhaust portion of said cycle occupies approximately 100° of rotation of said first and second cams, during which said second piston opens said exhaust valve and said first piston moves towards said second end in order to expel exhaust gases; and
said return portion occupies approximately 100° of rotation of said first and second cams, during which the pistons travel towards said first end returning to an initial position.

10. Internal combustion engine as claimed in claim 9, wherein said first and second pistons remain stationary during said burn subportion.

11. Internal combustion engine as claimed in claim 2, wherein said cylinder is a segment of a toroid, said first and second cam follower assemblies comprise first and second pivot arms connected to said first and second pistons respectively, said first and second pivot arms pivoting about a center of said toroid segment in a plane radial the rotational axis of said cams.

12. Internal combustion engine as claimed in claim 11, comprising a plurality of said cylinders all equally spaced from the cam axis sharing the same said cams, said first cam follower assemblies being connected to all said first pistons, said second cam follower assemblies being connected to all said second pistons, the cam axis being parallel to an axial plane of said toroidal cylinders.

13. Internal combustion engine as claimed in claim 12, wherein said first and second connecting means further comprise first and second complementary cams and first and second complementary cam follower assemblies, the first and second complementary cams and the first and second complementary cam follower assemblies cooperating with the first and second cams and cam follower assemblies to provide a solid mechanical linkage between the first and second pistons and the output shaft for reciprocal motion of the first and second pistons in said cylinder.

14. Internal combustion engine as claimed in claim 13, wherein said first and second complementary cams comprise a groove in each said first and second cams respectively, and said first and second complementary cam follower assemblies each comprise a maintaining roller for engaging an outside face of said groove of said first and second cams respectively, each said maintaining roller being pivotally connected to a corresponding one of said cam follower assemblies by an extension arm.

15. Internal combustion engine as claimed in claim 2, wherein a shape of said cylinder is of a straight cylindrical form, said first and second cam follower assemblies comprise first and second pivot arms connected to said first and second pistons respectively by first and second piston pins and rods.

16. Internal combustion engine as claimed in claim 15, comprising a plurality of said cylinders all equally spaced from a rotation axis of said cams and sharing the same said cams, said first cam follower assemblies being connected to all said first pistons, said second cam follower assemblies being connected to all said second pistons by said first and second piston pins and rods, the cam axis being parallel to an axis of said cylinders.

17. Internal combustion engine as claimed in claim 16, wherein said first and second connecting means further comprise first and second complementary cams and first and second complementary cam follower assemblies, the first and second complementary cams and the first and second complementary cam follower assemblies cooperating with the first and second cams and cam follower assemblies to provide a solid mechanical linkage between the first and second pistons and the output shaft for reciprocal motion of the first and second pistons in said cylinder.

18. Internal combustion engine as claimed in claim 17, wherein said first and second complementary cams comprise a groove in each said first and second cams respectively, and said first and second complementary can follower assemblies each comprise a maintaining roller for engaging an outside face of said groove of said first and second cams respectively, each said maintaining roller being pivotally connected to a corresponding one of said cam follower assemblies by an extension arm.

19. Internal combustion engine as claimed in claim 2, wherein said cylinder inner wall is provided with an insert piece of thermally insulating material.

20. An opposed piston internal combustion engine comprising:
an output shaft;
at least one cylinder;
at least one pair of first and second opposed pistons slidable in said cylinder, said pair of pistons defining a space within said cylinder;
first connecting means comprising a first cam connected to the output shaft and a first cam follower assembly connecting the first piston to the first cam;
second connecting means comprising a second cam connected to the output shaft and a second cam follower assembly connecting the second piston to the second cam;
intake valve means comprising a slide valve obtained by said first piston covering and uncovering an intake port provided in a sidewall of said cylinder at a first end of said cylinder;
exhaust valve means comprising a slide valve obtained by said second piston covering and uncovering an exhaust port provided in the sidewall of said cylinder at a second opposite end of said cylinder, the first and second connecting means cooperating to provide a cycle of relative movements between the pistons and of valve actions giving rise to five portions of said cycle: (i) intake, (ii) compression, (iii) expansion, (iv) exhaust, and (v) return, said expansion portion including burn and work subportions; and
wherein said first and second connecting means further comprise first and second complementary cams and first and second complementary cam follower assemblies, said first and second complementary cams and said first and second complementary cam follower assemblies cooperating with said first and second cams and cam follower assemblies to provide a solid mechanical linkage between said first and second pistons and said output shaft for reciprocal motion of said first and second pistons in said cylinder.

21. An opposed piston internal combustion engine comprising:
an output shaft;
at least one cylinder;
at least one pair of first and second opposed pistons slidable in said cylinder, said pair of pistons defining a space within said cylinder;
first connecting means comprising a first cam connected to the output shaft and a first cam follower assembly connecting the first piston to the first cam;
second connecting means comprising a second cam connected to the output shaft and a second cam follower assembly connecting the second piston to the second cam;
intake valve means comprising a slide valve obtained by said first piston covering and uncovering an intake port provided in a sidewall of said cylinder at a first end of said cylinder;
exhaust valve means comprising a slide valve obtained by said second piston covering and uncovering an exhaust port provided in the sidewall of said cylinder at a second opposite end of said cylinder, the first and second connecting means cooperating to provide a cycle of relative movements between the pistons and of valve actions giving rise to five portions of said cycle: (i) intake, (ii) compression, (iii) expansion, (iv) exhaust, and (v) return, said expansion portion including burn and work subportions; and
wherein said cylinder is a segment of a toroid, said first and second cam follower assemblies comprise first and second pivot arms connected to said first and second pistons respectively, said first and second pivot arms pivoting about a center of said toroid segment in the same plane as the rotational plane of said cams.

22. An opposed piston internal combustion engine comprising:
an output shaft;
at least one cylinder;
at least one pair of first and second opposed pistons slidable in said cylinder, said pair of pistons defining a space within said cylinder;
first connecting means comprising a first cam connected to the output shaft and a first cam follower assembly connecting the first piston to the first cam;

second connecting means comprising a second cam connected to the output shaft and a second cam follower assembly connecting the second piston to the second cam;

intake valve means comprising a slide valve obtained by said first piston covering and uncovering an intake port provided in a sidewall of said cylinder at a first end of said cylinder;

exhaust valve means comprising a slide valve obtained by said second piston covering and uncovering an exhaust port provided in the sidewall of said cylinder at a second opposite end of said cylinder, the first and second connecting means cooperating to provide a cycle of relative movements between the pistons and of valve actions giving rise to five portions of said cycles: (i) intake, (ii) compression, (iii) expansion, (iv) exhaust, and (v) return, said expansion portion including burn and work subportions; and wherein said cylinder is a segment of a toroid, said first and second cam follower assemblies comprise first and second pivot arms connected to said first and second pistons respectively, said first and second pivot arms pivoting about a center of said toroid segment in a plane radial to the rotational axis of said cams.

23. An opposed piston internal combustion engine comprising:

an output shaft;

at least one cylinder;

at least one pair of first and second opposed pistons slidable in said cylinder, said pair of pistons defining a space within said cylinder;

first connecting means comprising a first cam connected to the output shaft and a first cam follower assembly connecting the first piston to the first cam;

second connecting means comprising a second cam connected to the output shaft and a second cam follower assembly connecting the second piston to the second cam;

intake valve means comprising a slide valve obtained by said first piston covering and uncovering an intake port provided in a sidewall of said cylinder at a first end of said cylinder;

exhaust valve means comprising a slide valve obtained by said second piston covering and uncovering an exhaust port provided in the sidewall of said cylinder at a second opposite end of said cylinder, the first and second connecting means cooperating to provide a cycle of relative movements between the pistons and of valve actions giving rise to five portions of said cycle: (i) intake, (ii) compression, (iii) expansion, (iv) exhaust, and (v) return, said expansion portion including burn and work subportions; and wherein a shape of said cylinder is of a straight cylindrical form, said first and second cam follower assemblies comprise first and second pivot arms connected to said first and second pistons respectively by a first and second piston pins and rods.

* * * * *